United States Patent
Lai et al.

(10) Patent No.: US 8,693,461 B2
(45) Date of Patent: Apr. 8, 2014

(54) WI-FI QUALITY OF SERVICE SIGNALING

(75) Inventors: Frederick Chee-Kiong Lai, Halifax (CA); Miranda Bing Ying Lim, Nepean (CA)

(73) Assignee: BlackBerry Limited, Waterloo, Ontario (CA)

(*) Notice: Subject to any disclaimer, the term of this patent is extended or adjusted under 35 U.S.C. 154(b) by 482 days.

(21) Appl. No.: 12/891,976

(22) Filed: Sep. 28, 2010

(65) Prior Publication Data

US 2011/0013513 A1  Jan. 20, 2011

Related U.S. Application Data

(63) Continuation of application No. 11/554,075, filed on Oct. 30, 2006, now Pat. No. 7,843,820.

(51) Int. Cl.
*H04L 12/28* (2006.01)

(52) U.S. Cl.
USPC .......................................... 370/351

(58) Field of Classification Search
USPC .............. 370/351, 389, 395.1, 395.4, 395.42; 455/402, 422, 435.1, 435.2, 435.3; 709/204, 207
See application file for complete search history.

(56) References Cited

U.S. PATENT DOCUMENTS

| | | | |
|---|---|---|---|
| 5,278,889 A | 1/1994 | Papanicolaou et al. | |
| 6,094,575 A | 7/2000 | Anderson et al. | |
| 6,781,971 B1 * | 8/2004 | Davis et al. | 370/329 |
| 7,002,980 B1 | 2/2006 | Brewer et al. | |
| 7,142,563 B1 | 11/2006 | Lin | |
| 7,180,855 B1 | 2/2007 | Lin | |
| 7,286,551 B2 | 10/2007 | Park et al. | |
| 7,321,591 B2 | 1/2008 | Daniel et al. | |
| 7,656,798 B1 | 2/2010 | Lin | |
| 2002/0097747 A1 | 7/2002 | Kirkby et al. | |
| 2003/0156578 A1 | 8/2003 | Bergenlid et al. | |
| 2003/0172104 A1 | 9/2003 | Hooman et al. | |
| 2003/0231594 A1 | 12/2003 | Xu et al. | |
| 2004/0042460 A1 | 3/2004 | Gruhl et al. | |
| 2004/0081180 A1 | 4/2004 | De Silva et al. | |
| 2005/0025167 A1 | 2/2005 | Ishibashi et al. | |
| 2005/0094567 A1 | 5/2005 | Kannan et al. | |
| 2006/0140186 A1 | 6/2006 | LoGalbo et al. | |
| 2006/0165103 A1 | 7/2006 | Trudeau et al. | |

(Continued)

FOREIGN PATENT DOCUMENTS

| | | |
|---|---|---|
| GB | 2404531 | 2/2005 |
| WO | 0072608 | 11/2000 |
| WO | 2006103151 | 10/2006 |

OTHER PUBLICATIONS

Bayaa, Hassan, Third Office Action for CA 2,601,150, Jan. 16, 2012.

(Continued)

*Primary Examiner* — Fan Ng

(74) *Attorney, Agent, or Firm* — Integral Intellectual Property Inc.; Miriam Paton

(57) ABSTRACT

The transmission of signaling frames in a QoS system may be prioritized over the transmission of content frames carrying time-sensitive information. The signaling frames and the content frames may belong to a single communication session. Alternatively, the signaling frames may belong to a different communication session than the content frames. The signaling frames and the content frames may be audio frames, video frames or frames of other time-sensitive information.

15 Claims, 7 Drawing Sheets

(56) References Cited

U.S. PATENT DOCUMENTS

| | | |
|---|---|---|
| 2006/0187865 A1 | 8/2006 | Sakai |
| 2007/0283430 A1 | 12/2007 | Lai et al. |
| 2008/0014956 A1 | 1/2008 | Balasubramanian |
| 2008/0293444 A1 | 11/2008 | Furuskar et al. |
| 2009/0067326 A1* | 3/2009 | Perrot et al. ............... 370/230 |
| 2009/0285232 A1 | 11/2009 | Lin |

OTHER PUBLICATIONS

Karavassilis, Nick, First Exam Report for EP 06123160.1, May 22, 2012.

"IEEE Standard for Information technology—Telecommunications and information exchange between systems—Local and metropolitan area networks—Specific requirements, Part 11: Wireless LAN Medium Access Control (MAC) and Physical Layer (PHY) Specifications", Jun. 12, 2007 , 54, 55, 252-256, 286-287.

Bayaa, Hassan, First Office Action for CA 2,601,150, Nov. 3, 2009.

Karavasslis, N., Extended European Search Report for 06123160.1, Oct. 25, 2007.

Wyllie, Christopher T., Fifth Office Action for U.S. Appl. No. 11/554,075, May 28, 2010.

Wyllie, Christopher T., First Office Action for U.S. Appl. No. 11/554,075, Jan. 22, 2009.

Wyllie, Christopher T., Fourth Office Action for U.S. Appl. No. 11/554,075, Dec. 24, 2009.

Wyllie, Christopher T., Notice of Allowance for U.S. Appl. No. 11/554,075, Oct. 6, 2010.

Wyllie, Christopher T., Second Office Action for U.S. Appl. No. 11/554,075, Jul. 9, 2009.

Bayaa, Hassan, Second Office Action for CA 2,601,150, Apr. 4, 2011.

\* cited by examiner

WI-FI QUALITY OF SERVICE SIGNALING

CROSS-REFERENCE TO RELATED APPLICATIONS

This application is a continuation of U.S. patent application Ser. No. 11/554,075 filed Oct. 30, 2006, entitled "Wi-Fi Quality of Service Signaling", now U.S. Pat. No. 7,843,820, issued Nov. 30, 2010, which is incorporated by reference herein in its entirety.

BACKGROUND

Multimedia applications in a Wi-Fi network can benefit from Quality of Service (QoS) functionality. QoS enables Wi-Fi devices to prioritize traffic and optimizes the way shared network resources are allocated among different applications. Without QoS, all applications running on different devices have an equal opportunity to transmit data frames. That may work well for data traffic from applications such as web browsers, file transfers, or email, but it is less appropriate for multimedia applications. Voice over Internet Protocol (VoIP), video streaming and interactive gaming, for example, are highly sensitive to latency increases and throughput reductions, and can benefit from QoS.

To meet the need for quality of service, the QoS task group of the Wi-Fi Alliance published the Wi-Fi MultiMedia (WMM) specifications 1.1. This priority-based method was adopted by the Wi-Fi Alliance as a baseline set of QoS features to be certified in devices that support new QoS capabilities defined in Institute of Electrical and Electronic Engineers (IEEE) 802.11e. WMM provides QoS via Enhanced Distributed Coordination Function (EDCF), the ability to perform four queues of priority QoS, and optional features such as admission control and burst acknowledgement. EDCF is based on probability and statistically favors high-priority traffic. EDCF's channel-access scheme is Enhanced Distributed Channel Access (EDCA). Two access mechanisms are specified by IEEE 802.11e—EDCA and Hybrid Coordinate Channel Access (HCCA). The Wi-Fi Multimedia—Scheduled Access (WMM-SA) specification supports HCCA-based centralized scheduling in addition to EDCA.

The transmission of frames carrying time-sensitive content ("content frames") such as audio and video from a station (STA) during a communication session requires the transmission of signaling frames responsible for the creation, maintenance and termination of the communication session. For example, a STA and a teleconferencing server may exchange signaling frames to establish a communication session before a teleconferencing application in the STA can participate in a teleconference managed by the server. The server may also expect to properly exchange signaling frames with the STA in order to terminate the communication session.

WMM specifications version 1.1 prioritizes traffic demands from different applications in order to extend Wi-Fi's high quality end-user experience from data connectivity to voice, music, and video applications. In systems supporting QoS, the transmission of content frames during a communication session may be prioritized over the transmission of other information. For example, if the QoS mechanism of a Wi-Fi system is implemented according to the WMM/IEEE 802.11e—EDCA specification, the signaling frames may be assigned priorities that are at most equal to the priority assigned to the content frames. If, for any reason, content frames are jamming the wireless medium (WM) over which they are transmitted, the timely transmission of both content frames and signaling frames is degraded. The successful transmission of signaling frames to resolve the WM's jamming may be delayed due to the jamming itself, and the result may be a prolonged time during which quality of service for the voice streams over the WM is degraded.

In an Infrastructure network, a WMM-enabled AP and a WMM-enabled STA negotiate WMM QoS parameters on association and re-association. Following an association, the AP may advertise changes to QoS parameters at any time in beacon frames.

A WMM-enabled AP includes either a WMM Information Element (IE) or a WMM Parameter Element (PE) in every beacon it transmits. A WMM IE includes a QoS information field and indicates capability or use of WMM according to context, and is described in section 2.2.1 of WMM specifications 1.1. A WMM PE contains a QoS information field and EDCA parameter records for each of the four access categories and is described in section 2.2.2 of WMM specifications 1.1.

A WMM-enabled STA determines the WMM capability of an AP with which it wishes to associate before transmitting an association request to it. It may do this either passively, by receiving a beacon frame, or actively, by transmitting a probe request to it. The STA then sends an association request to the AP and includes a WMM IE in the association request. On receipt of an association request, the AP responds by transmitting an association response that includes a WMM PE.

WMM leaves the network owner free to choose the most appropriate network-wide policy and to decide which access categories have priority. For instance, a network owner may prefer to give priority to video streaming over voice. A customized policy for the access categories can be set through an interface in which default priority levels for access categories can be modified.

With WMM, applications assign each MAC Service Data Unit (MSDU) to a given access category. MAC headers of frames of type "data" and subtype "QoS data" or "QoS null" carry a QoS control field, which contains 3 bits defining the user priority assigned to the frame. Both content MAC frames and signaling MAC frames are of type "data" and typically are of subtype "QoS data".

MSDUs are then sorted and added to one of four independent transmit queues (one per access category; i.e., voice, video, best effort, or background) in the STA. The STA has an internal collision resolution mechanism to address collision among different queues, which selects the frames with the highest priority to transmit. The same mechanism deals with external collision, to determine which STA should gain time for transmission.

The time gained by the STA depends on the access category and the Physical layer (PHY) rate. For instance, the limit on the duration of the time ranges from 0.2 ms (background priority) to 3 ms (video priority) in an IEEE 802.11a/g network, and from 1.2 ms to 6 ms in an IEEE 802.11b network. This bursting capability enhances the efficiency for high data rate traffic, such as Audio/Video (AV) streaming. In addition, devices operating at higher PHY rates are not penalized when devices that support only lower PHY rates (e.g. because of distance) contend for access to the medium.

With the default priorities used, voice-related MSDUs have the highest priority to be transmitted and are more likely to be transmitted than MSDUs of other types. However, a wireless medium used for the transmission has a limited capacity and therefore there is a limit to the number of voice-related MSDUs it can handle in any given time.

If the demand to transmit voice-related MSDUs is higher than the capacity of the WM, for example, because the number of voice streams that are concurrently handled by the WM is too high, some percentage of the voice-related MSDUs will be dropped and not transmitted. A network management module may attempt to handle such a situation by terminating one or more of the voice streams.

In order to do so, the network management module may have to initiate transmission of one or more voice-signaling MSDUs to STAs participating in one or more of the voice streams. Due to the saturation of the WM, such voice-signaling MSDUs may also be dropped and the network management module may have to retry transmission until it succeeds. The result may be a prolonged time during which quality of service for the voice streams over the wireless link is degraded.

A similar degradation in quality of service may occur if a WM is saturated with video streams and/or a combination of video and audio streams.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

Figure 1:
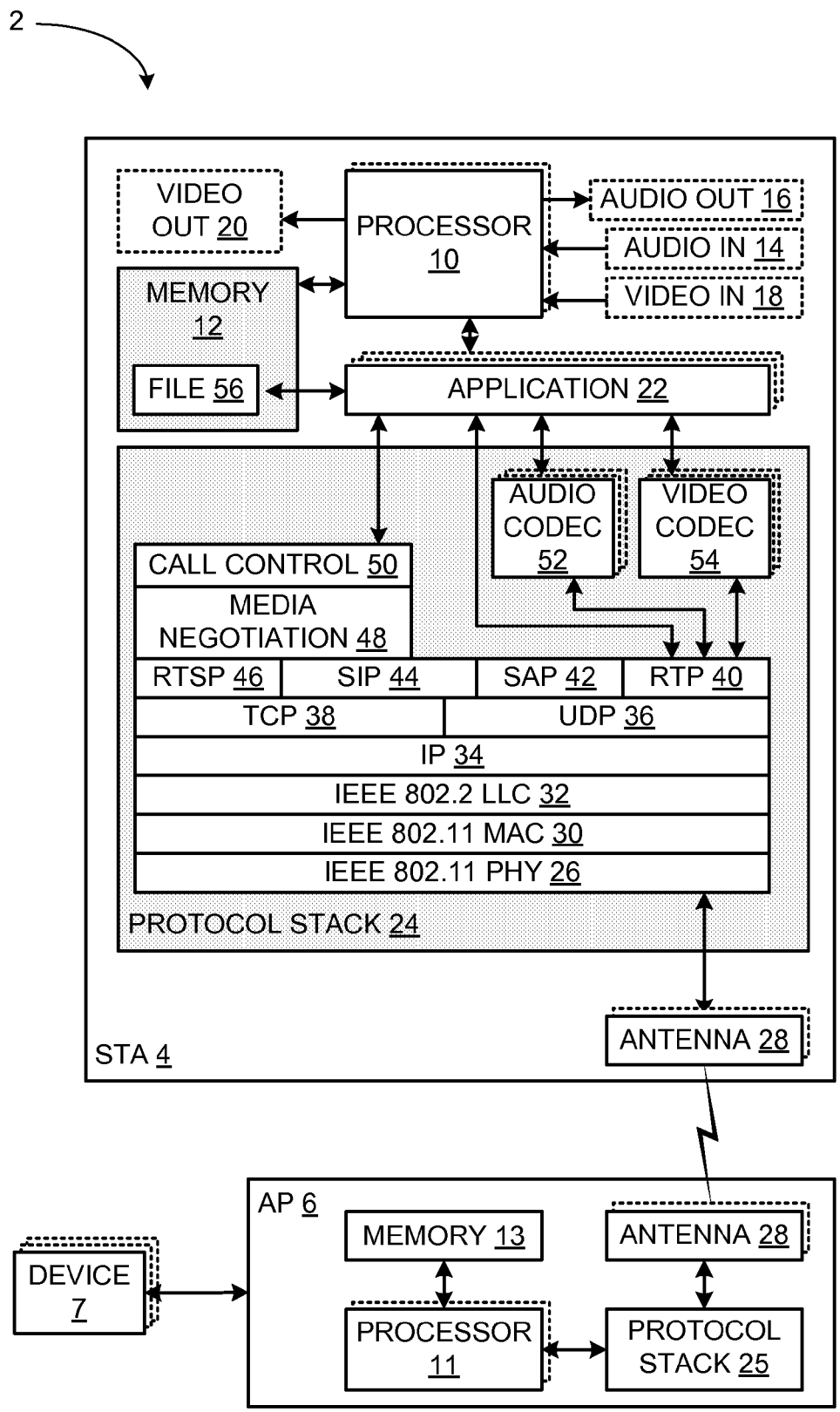
FIG. 1 is a simplified functional diagram of an exemplary communication system.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

The transmission of signaling frames in a QoS system may be prioritized over the transmission of content frames carrying time-sensitive information. The signaling frames and the content frames may belong to a single communication session. Alternatively, the signaling frames may belong to a different communication session than the content frames. The signaling frames and the content frames may be audio frames, video frames or frames of other time-sensitive information. The signaling frames and the content frames may be generated by the communication device or received by the communication device.

In one aspect, signaling frames are assigned a higher priority access category than content frames. For example, voice signaling frames and video signaling frames may be assigned a higher priority access category than voice content frames, which in turn may be assigned a higher priority access category than video content frames. In another example, voice signaling frames and video signaling frames may be assigned a higher priority access category than that assigned to voice content frames and video content frames. In a further example, voice signaling frames may be assigned a higher priority access category than that assigned to voice content frames and video signaling frames, which in turn may be assigned a higher priority access category than video content frames.

In another aspect, signaling frames are tagged with a different tag than content frames, and frames are propagated through different queues based on their tags. Transmission from the signaling queue may be prioritized over transmission from the content queue. The prioritization may involve load balancing. This tagging, queue management and priority/load balancing may occur at the Logical Link Control (LLC) layer of a protocol stack compatible with IEEE 802.11, thus preserving legacy Media Access Control (MAC) layer implementations. In yet another aspect, this tagging, queue management and priority/load balancing may occur at the MAC layer of a protocol stack compatible with IEEE 802.11.

The WMM/IEEE 802.11e—EDCA specification defines four access categories (AC) that are derived from IEEE 802.1d user priorities and correspond to default priority levels. The highest default priority is assigned to voice traffic (the "AC_VO" access category) and it corresponds to IEEE 802.1d user priorities "6" and "7". The second highest default priority is assigned to video traffic (the "AC_VI" access category) and it corresponds to IEEE 802.1d user priorities "4" and "5". The third highest default priority is assigned to best-effort (the "AC_BE" access category) traffic (and traffic from legacy devices that do not support QoS) and it corresponds to IEEE 802.1d user priorities "3" and "0". The lowest default priority is assigned to background traffic (the "AC_BK" access category) that does not have strict latency and throughput requirements, and it corresponds to IEEE 802.1d user priorities "2" and "1". Voice and video are examples of time-sensitive information. Other examples include audio and interactive gaming. Although the following description refers to the WMM specifications 1.1, it should be obvious to one of ordinary skill in the art how to modify the following description for any other QoS implementation.

According to embodiments of the invention, the transmission of signaling frames in a QoS system may be prioritized over the transmission of content frames. Embodiments of the invention may be embedded, for example, in the Media Access Control (MAC) layer and/or the Logical Link Control (LLC) layer of a protocol stack compatible with IEEE 802.11.

Three exemplary embodiments of the invention are presented. The first exemplary embodiment (presented in FIGS. 2, 3A, 3B and 3C) is based on a legacy implementation according to WMM specifications 1.1 and a change in the assignment of traffic types to access categories. The second and third exemplary embodiments (presented in FIGS. 4 and 5 and in FIGS. 6 and 7, respectively) are based on splitting one or more access categories (AC_VO, AC_VI or both) into signaling and content subcategories, and prioritizing the signaling subcategories over the content subcategories. The exemplary embodiments presented in FIGS. 4 and 5 preserve the legacy implementation of the MAC layer, while the exemplary embodiments presented in FIGS. 6 and 7 involve suggested modifications to the MAC layer that are permitted by WMM specifications 1.1.

If the operation of STAs and access points (APs) according to the second or third exemplary embodiments of the invention is standardized, and any STA or AP that receives AC_VO and/or AC_VI MAC frames over a WM is able to distinguish between signaling and content frames, then embodiments such as the second or third embodiments may be implemented in APs and STAs along propagation paths of MAC frames. Consequently, signaling frames may receive higher priority than content frames along an entire propagation path of MAC frames. However, it is also contemplated that the operation of STAs and APs according to the second or third exemplary embodiments of the invention may not be standardized.

FIG. 1 is a simplified functional diagram of an exemplary communication system 2 including a STA 4, an AP 6 and one or more communication devices 7. Devices 7 may be coupled to AP 6 via any combination of networks, wired, wireless and/or optical communication links and may be able to communicate with AP 6.

In the example of FIG. 1, STA 4 and AP 6 are compatible with one or more IEEE 802.11 standards. However, it will be obvious to those of ordinary skill in the art how to modify the following for other existing WLAN standards or future related standards.

A non-exhaustive list of examples for STA 4 includes wireless-enabled communication devices such as a laptop computer, a desktop computer, a wireless terminal, a hand-held computer, a personal digital assistant (PDA), a cellphone, a smartphone, a gaming console, a wireless IP (Internet Protocol) phone, a video camera, a teleconferencing unit, an MP3 (Moving Picture Experts Group Layer-3 Audio) player and any other suitable wireless mobile device.

STA 4 includes one or more processors 10 and a memory 12 coupled to processors 10. AP 6 includes one or more processors 11 and a memory 13 coupled to processors 11. A non-exhaustive list of examples for any of processors 10 and 11 includes a central processing unit (CPU), a digital signal processor (DSP), a reduced instruction set computer (RISC), a complex instruction set computer (CISC) and the like. Furthermore, any of processors 10 and 11 may be part of application specific integrated circuits (ASICs) or may be a part of application specific standard products (ASSPs).

A non-exhaustive list of examples for memories 12 and 13 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

STA 4 may include an audio input element 14, for example a microphone, and an audio output element 16, for example, a speaker, coupled to any of processors 10. STA 4 may include a video input element 18, for example, a video camera, and a video output element 20, for example an analog or a digital screen, coupled to any of processors 10.

STA 4 includes one or more applications 22 that are typically stored in memory 12 and are executable by any combination of processors 10. STA 4 includes a protocol stack 24 and AP includes a protocol stack 25. In the example of FIG. 1, stack 24 is shown to be an Internet Engineering Task Force (IETF) multimedia protocol stack, however embodiments of the invention are applicable to any other protocol stack, for example, the International Telecommunications Union (ITU) teleconferencing protocol stack. Stack 25 may be an IETF multimedia protocol stack, an ITU teleconferencing protocol stack or any other protocol stack.

Elements of stacks 24 and 25 may be implemented in any combination of software, firmware and/or hardware. For example, code implementing portions of stacks 24 and 25 may be stored in memories 12 and 13, respectively, and may be executable by any combination of processors 10 and 11, respectively. In another example, portions of stacks 24 and 25 may be implemented by dedicated hardware.

Stack 24 includes an IEEE 802.11-compatible PHY module 26 that is coupled to one or more antennae 28, an IEEE 802.11-compatible MAC module 30 coupled to PHY module 26 and an IEEE 802.2-compatible LLC module 32. Stack 24 includes a network layer IP module 34, a transport layer User Datagram Protocol (UDP) module 36 and a transport layer Transmission Control Protocol (TCP) module 38. Stack 24 includes a session layer Real Time Transport Protocol (RTP) module 40, a Session Announcement Protocol (SAP) module 42, a Session Initiation Protocol (SIP) module 44 and a Real Time Streaming Protocol (RTSP) module 46. Stack 24 includes a presentation layer media negotiation module 48, a call control module 50, one or more audio codecs (coder—decoder) 52 and one or more video codecs 54.

Applications 22 may be able to create, maintain and/or terminate communication sessions with any of devices 7 by way of AP 6. Typically, applications 22 may activate any of the SAP, SIP, RTSP, media negotiation and call control modules for that purpose. Typically, information may propagate from the SAP, SIP, RTSP, media negotiation and call control modules to PHY module 26 through TCP module 38, IP module 34, LLC module 32 and MAC module 30.

After a communication session is established with any of devices 7 by the exchange of signaling frames, applications 22 may be able to operate stack 24 in order to communicate content frames including compressed audio and/or compressed video to devices 7 by way of AP 6. For example, applications 22 may control audio codec 52 to generate a compressed audio stream from audio received from audio input element 14 and may be able to send the compressed audio stream to AP 6 through RTP module 40. Typically, compressed audio and/or video streams propagate from RTP module 40 to PHY module 26 via UDP module 36, IP module 34, LLC module 32 and MAC module 30.

In another example, applications 22 may control video codec 52 to generate a compressed video stream from video received from video input element 18 and may be able to send the compressed video stream to AP 6 through RTP module 40.

In yet another example, memory 12 may store one or more compressed video and/or audio files 56, and applications 22 may be able to stream any of files 56 to AP 6 through RTP module 40 using content frames.

A non-exhaustive list of examples for audio codecs 52 includes G711, G722, G723, G.726, G.728, G.729, MP3, Windows® Media Audio (WMA), Vector Sum Excited Linear Prediction (VSELP), Digital Speech Standard (DSS), and any other suitable audio codec.

A non-exhaustive list of examples for video codecs 54 includes H.261, H.263, H.264, flavors of Moving Picture Experts Group (MPEG), RealVideo®, Windows® Media Video, DivX®, Pixlet®, and any other suitable video codec.

The functional architecture of STA 4 as shown in FIG. 1 is merely an example, and embodiments of the invention are applicable to communication devices having any other functional architecture. For example, a communication device may not include audio elements and/or a camera and/or a display and/or user input elements and may be connectable to external such elements. In another example, a communication device may include in stack 24 modules that are not shown in the FIG. 1 and/or may not include one or more modules of stack 24 that are shown in FIG. 1.

Figure 2:
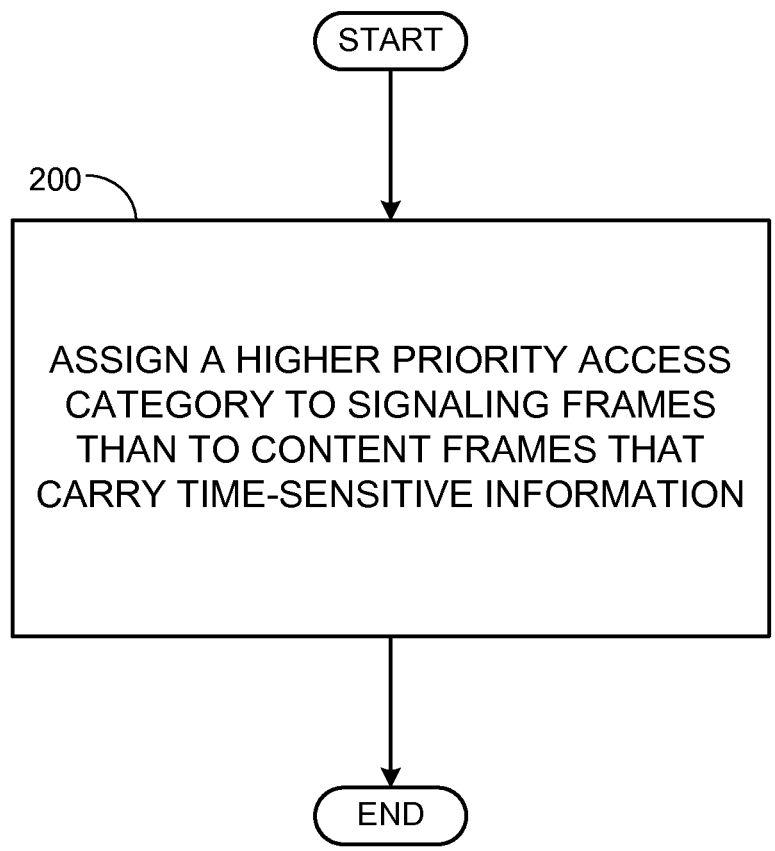
FIG. 2 is a flowchart of an exemplary method in an access point.

FIG. 2 presents one exemplary embodiment of the invention to prioritize transmission of "signaling frames" over transmission of content frames. FIG. 2 is a simplified flowchart of an exemplary method in STA 4. The method of FIG. 2 may be implemented by any combination of applications 22 and/or modules of stack 24. At 200, signaling frames for the creation, maintenance and/or termination of communication sessions to carry time-sensitive streams such as voice, video and/or audio streams are assigned a higher priority access category than content frames carrying the time-sensitive information.

Figure 3A:
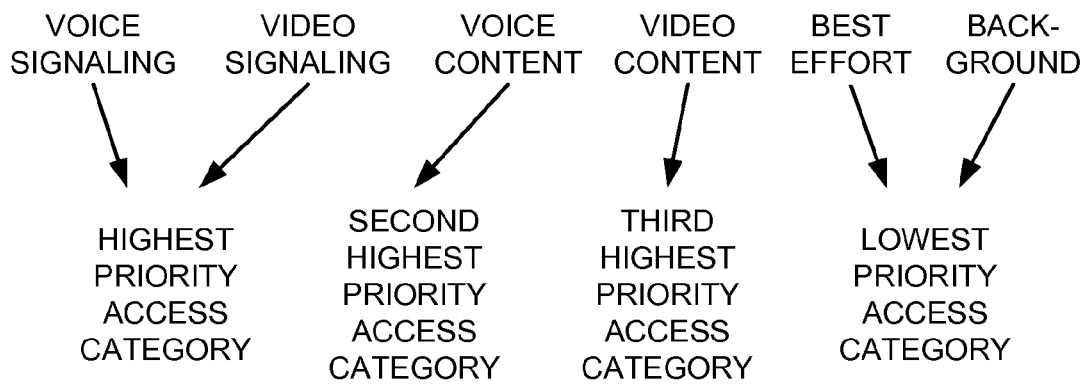
FIGS. 3A, 3B and 3C show exemplary assignments of access categories of different priorities to different types of frames.

For example, as shown in FIG. 3A, voice signaling frames and video signaling frames may be assigned the highest priority access category, voice content frames may be assigned the second highest priority access category, video content frames may be assigned the third highest priority access category, and background and best effort MAC frames may be assigned the lowest priority access category. If WMM default priorities are used, then in this example, signaling frames are assigned the AC_VO access category, voice content frames are assigned the AC_VI access category, video content frames are assigned the AC_BK access category, and background and best effort MAC frames are assigned the AC_BE access category.

Figure 3B:
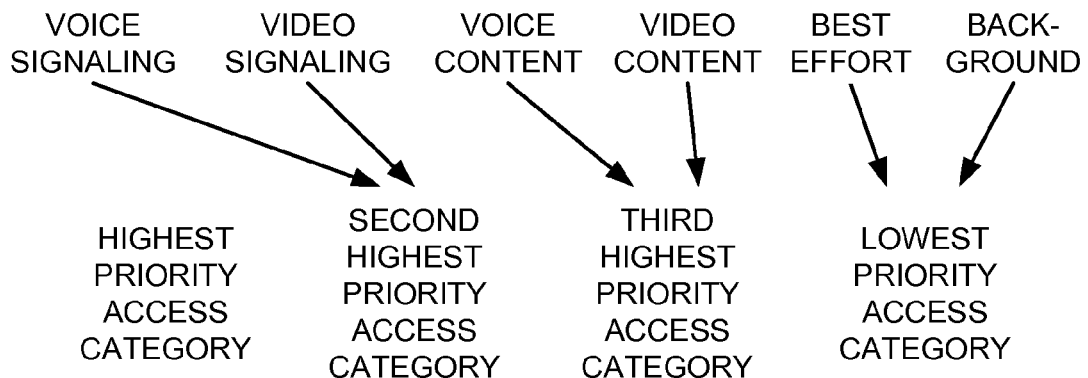

In another example, shown in FIG. 3B, voice signaling frames and video signaling frames may be assigned the second highest priority access category, voice content frames and video content frames may be assigned the third highest priority access category, and background and best effort MAC frames may be assigned the lowest priority access category. This assignment may be suitable in environments where signaling frames are constrained to have no higher than the second highest priority access category.

Figure 3C:
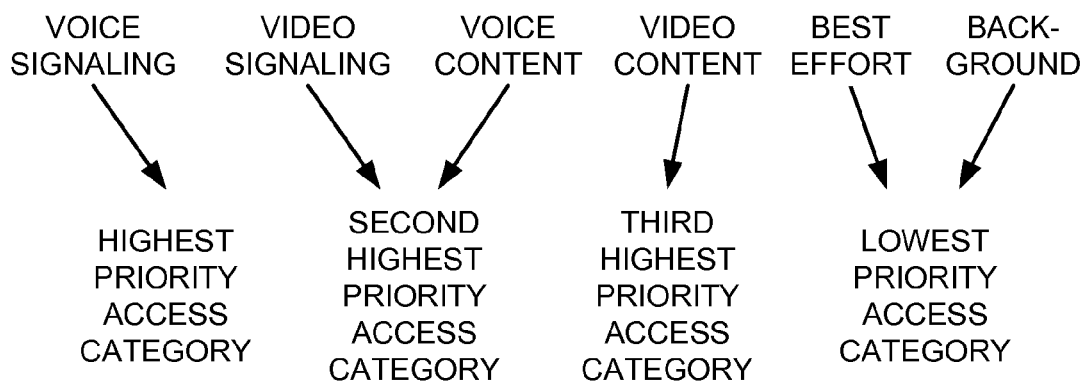

In yet another example, shown in FIG. 3C, voice signaling frames may be assigned the highest priority access category, video signaling frames and voice content frames may be assigned the second highest priority access category, video content frames may be assigned the third highest priority access category, and background and best effort MAC frames may be assigned the lowest priority access category.

Figure 4:
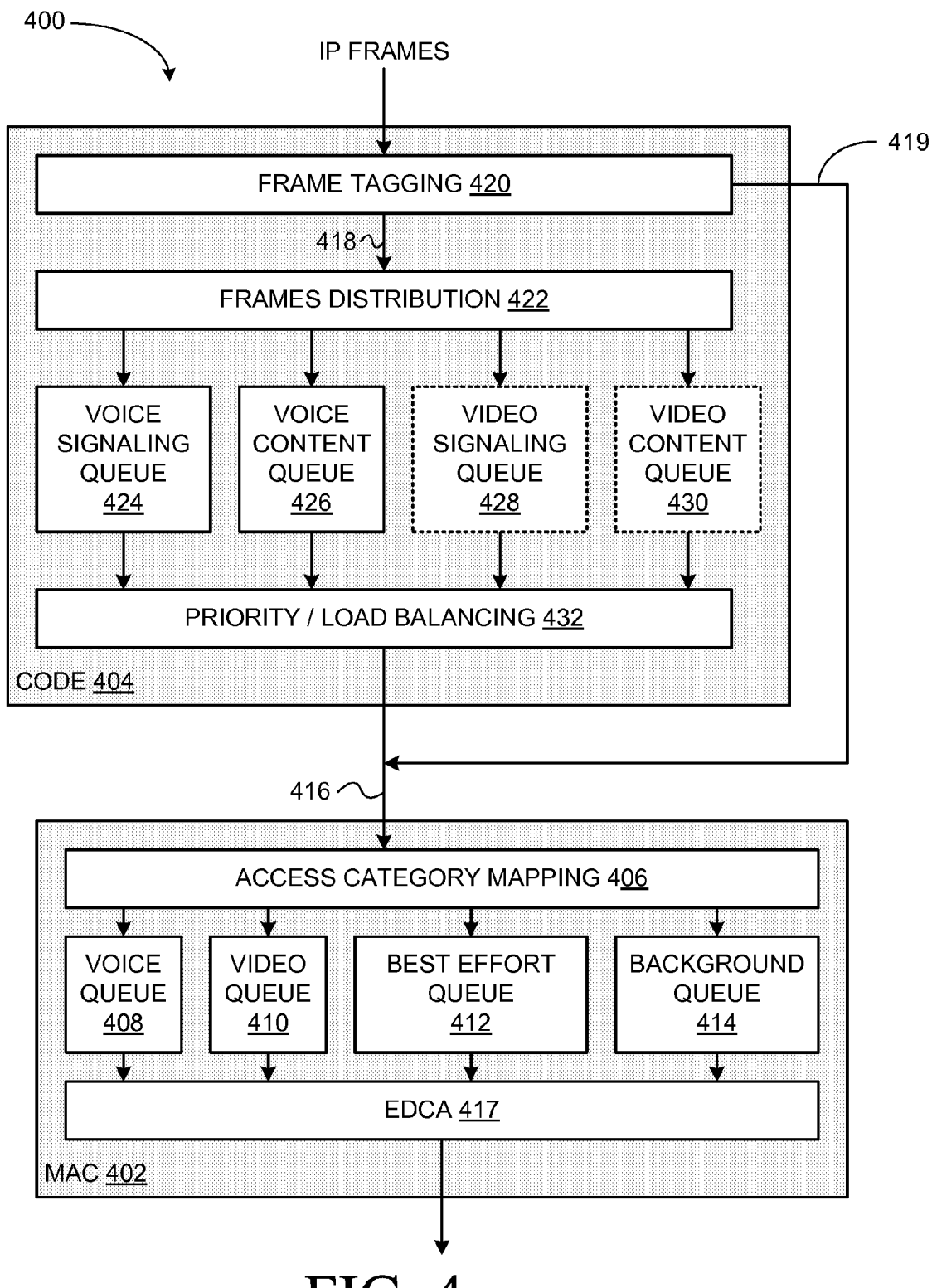
FIG. 4 is a simplified functional diagram in a communication device.
Figure 5:
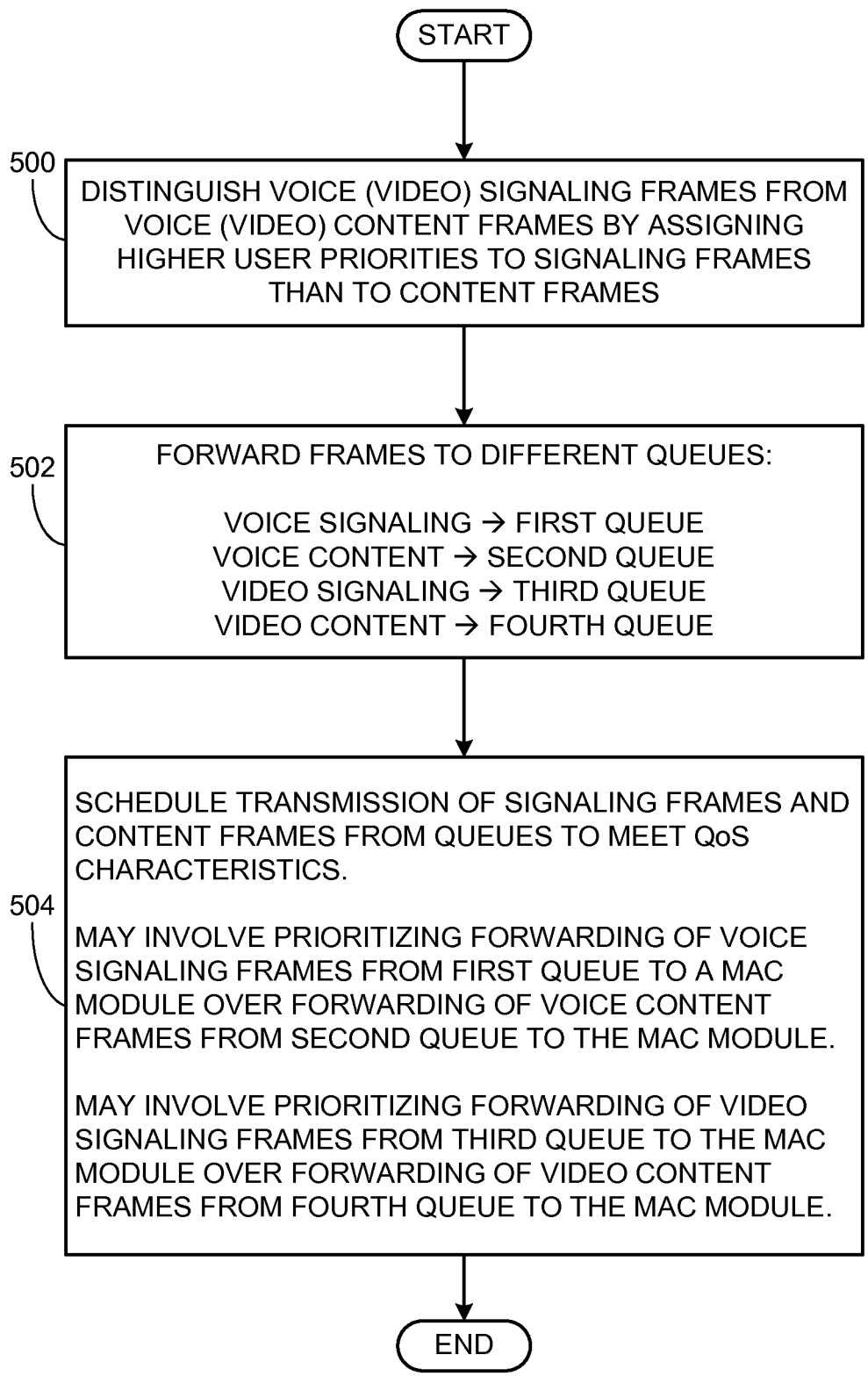
FIG. 5 is a simplified flowchart of an exemplary method in the communication device of FIG. 4.

Reference is now made to FIGS. 4 and 5. FIG. 4 is a simplified functional diagram of a communication device 400 including a MAC module 402 and a code 404. FIG. 5 is a simplified flowchart of an exemplary method in device 400. Device 400 may be a STA or an AP, and in this example is an IEEE 802.11e EDCA/WMM capable Wi-Fi device.

MAC module 402 implements the reference implementation described in section 3.4.1 of WMM specifications 1.1, and comprises an access category mapping unit 406 and queues 408, 410, 412 and 414 having channel access, internal collision resolution, and sequence number counting functionality. MAC module 402 is able to receive IEEE 802.1d tagged MSDUs, represented by an arrow 416, to distribute them to queues 408, 410, 412 and 414 and to prioritize their transmission. For example, MSDUs with IEEE 802.1d tags corresponding to the AC_VO, AC_VI, AC_BE and AC_BK access categories may be routed through queues 408, 410, 412 and 414, respectively. As is known in the art, MAC module 402 also comprises an EDCA module 417 coupled to queues 408, 410, 412 and 414.

Code 404 may be implemented, for example, in an LLC module of device 400 to prioritize the transmission of signaling frames over the transmission of content frames. Code 404 includes a frame tagging module 420, a frame distribution module 422, queues 424, 426, optional queues 428 and 430, and a prioritization/load balancing module 432.

Frame tagging module 420 translates the QoS level specified in the header of an IP frame at the ToS field into an IEEE 802.1d user priority. The ToS field values may follow a quality of service identification scheme called DSCP, which is known in the art. The ToS field values may have been assigned at the application level, for example, by one of applications 22. From the ToS field value and/or other IP header values, frame tagging module 420 is able to identify which IP frames are signaling frames and which are content frames. Likewise, from the ToS field value and/or other IP header values, frame tagging module 420 is able to identify which IP frames are voice frames and which are video frames.

IP frames related to best effort traffic are identified as such by frame tagging module 420, tagged with an appropriate user priority associated with the AC_BE access category (for example, IEEE 802.1d user priority "3"), and forwarded to MAC module 402 as indicated by an arrow 419. Likewise, IP frames related to background traffic are identified as such by frame tagging module 420, tagged with an appropriate user priority associated with the AC_BK access category (for example, IEEE 802.1d user priority "1"), and forwarded to MAC module 402 as indicated by arrow 419.

At 500, frame tagging module 420 tags IP voice content frames with one of the user priorities associated with the AC_VO access category (for example, IEEE 802.1d user priority "6") and tags IP voice signaling frames with a higher user priority associated with the AC_VO access category (for example, IEEE 802.1d user priority "7"). Likewise, frame tagging module 420 tags IP video content frames with one of the user priorities associated with the AC_VI access category (for example, IEEE 802.1d user priority "4") and tags IP video signaling frames with a higher user priority associated with the AC_VI access category (for example, IEEE 802.1d user priority "5"). IP frames that are related to the AC_VI and AC_VO access categories are then passed from frame tagging module 420 to frames distribution module 422, as indicated by an arrow 418.

Some applications do not use ToS field values, but rather assign an IEEE 802.1d user priority directly to the IP frame. In such cases, frame tagging module 420 may not need to perform any translation and may merely direct the frames to arrows 418 and 419 as described above. If appropriate, frame tagging module 420 may alter the IEEE 802.1d user priority assigned by the application to signaling frames and content frames in order to ensure that the user priorities as described above are assigned instead.

At 502, frame distribution module 422 receives IP voice frames from module 420, and forwards voice signaling frames to queue 424 and voice content frames to queue 426. Likewise, frame distribution module 422 receives IP video frames from module 420, and forwards video signaling frames to queue 428 and video content frames to queue 430.

The function of priority/load balancing module 432 is to schedule the transmission of the signaling frames and the content frames so that each of them meets a certain QoS characteristic. A non-exhaustive list of examples for these QoS characteristics includes bandwidth requirements, jitter, delay, and periodicity. To achieve this, at 504, priority/load balancing module 432 may prioritize forwarding of voice signaling frames from queue 424 to MAC module 402 over forwarding of voice content frames from queue 426 to MAC module 402, and may prioritize forwarding of video signaling frames from queue 428 to MAC module 402 over forwarding of video content frames from queue 430 to MAC module 402. Other factors may influence the scheduling of the transmission of the signaling frames and the content frames by priority/load balancing module 432, including load balancing.

Figure 6:
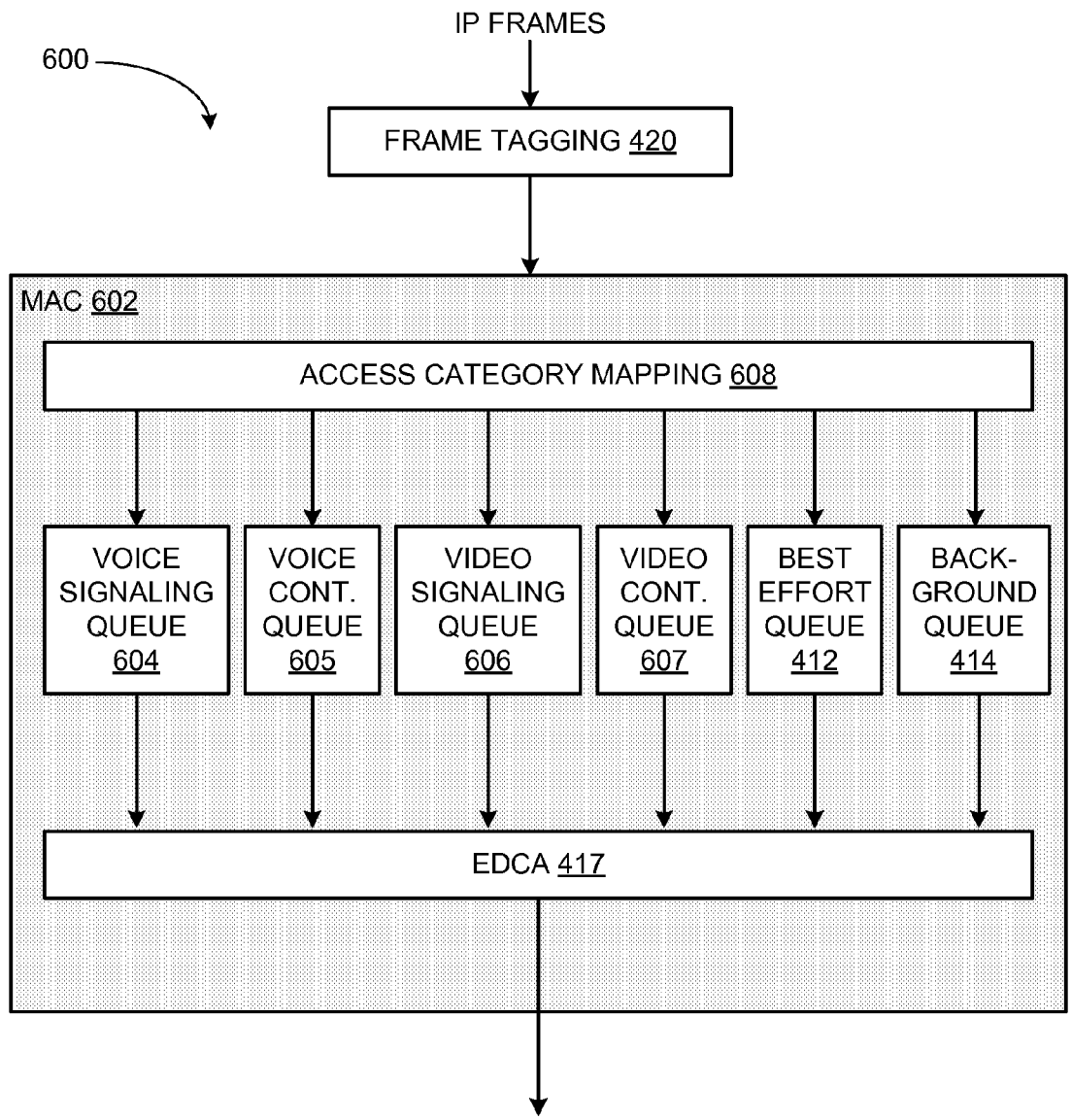
FIG. 6 is a simplified functional diagram in a communication device.
Figure 7:
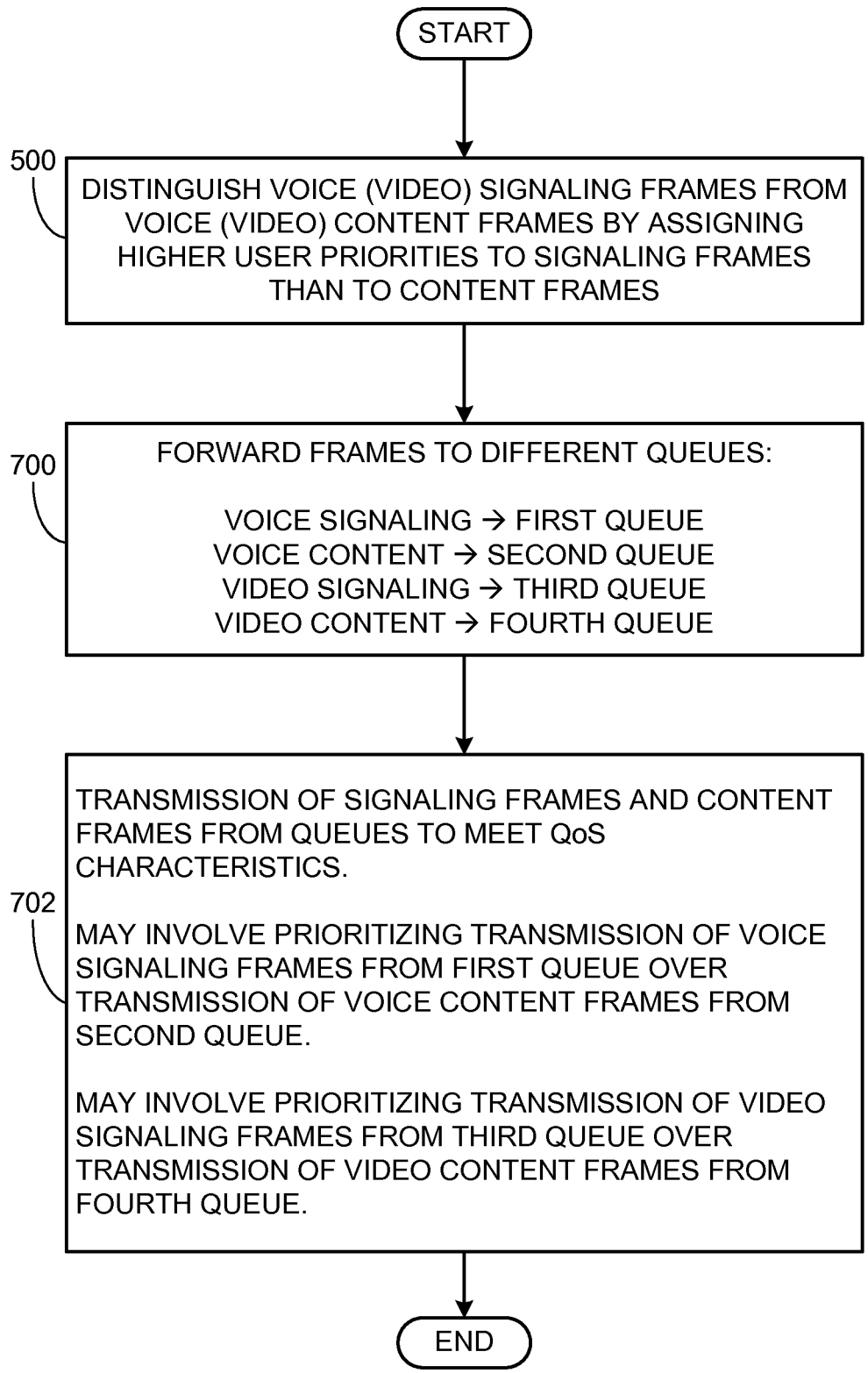
FIG. 7 is a simplified flowchart of another exemplary method in the communication device of FIG. 6.

Reference is now made to FIGS. 6 and 7. FIG. 6 is a simplified functional diagram of a communication device 600 including a MAC module 602 and frame tagging module 420, and FIG. 7 is a simplified flowchart of an exemplary method in device 600. Device 600 may be an STA or an AP.

MAC module 602 includes separate queues 604, 605, 606 and 607 for voice signaling, voice content, video signaling and video content, respectively. MAC module 602 also includes best effort queue 412 and background queue 414. The queues have channel access, internal collision resolution, and sequence number counting functionality. At 500, frame tagging module 420 operates on the IP frames as described above with respect to FIG. 5. As shown in FIG. 6, all IP frames pass through frame tagging module 420.

At 700, an access category mapping module 608 receives IEEE 802.1d tagged IP frames from frame tagging module 420 and distributes them to queues 604, 605, 606, 607, 412 and 414 to prioritize their transmission. MSDUs with IEEE 802.1d tags corresponding to the AC_BE and AC_BK access categories are routed to queues 412 and 414, respectively. Access category mapping module 608 routes AC_VO signaling frames to queue 604 and AC_VO content frames to queue 408. Likewise, access category mapping module 608 routes AC_VI signaling frames to queue 606 and AC_VI content frames to queue 607.

In an alternative embodiment, MAC module 602 has only a single queue for video traffic and all AC_VI frames are routed by access category mapping module 608 to that single video queue.

At 702, the internal collision resolution functionality of queues 604, 605, 606, 607, 412 and 414 prioritize transmission of MAC frames. Voice signaling frames have higher priority than voice content frames, and optionally, video signaling frames have higher priority than video content frames.

MAC module 602 also comprises EDCA module 417, which is known in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a wireless local area network communication device, the method comprising:
   assigning frames to access categories of different relative priority, where each access category has a different transmit queue associated therewith;
   adding frames assigned to a particular access category to the transmit queue associated with the particular access category; and
   selecting, in a manner that takes into account the relative priority of the access categories, frames from the transmit queues for transmission over a wireless medium,
   wherein the access categories consist of a first access category of highest priority defined for voice traffic, a second access category of second highest priority defined for video traffic, a third access category of third highest priority defined for best effort traffic, and a fourth access category of lowest priority defined for background traffic, and
   wherein assigning frames to access categories of different relative priority comprises:
      assigning voice signaling frames to the first access category;
      assigning video signaling frames to the first access category;
      assigning voice content frames to the second access category;
      assigning video content frames to the third access category;
      assigning best-effort frames to the fourth access category; and
      assigning background frames to the fourth access category.

2. A method in a wireless local area network communication device, the method comprising:
   assigning frames to access categories of different relative priority, where each access category has a different transmit queue associated therewith;
   adding frames assigned to a particular access category to the transmit queue associated with the particular access category; and
   selecting, in a manner that takes into account the relative priority of the access categories, frames from the transmit queues for transmission over a wireless medium,
   wherein the access categories consist of a first access category of highest priority defined for voice traffic, a second access category of second highest priority defined for video traffic, a third access category of third highest priority defined for best effort traffic, and a fourth access category of lowest priority defined for background traffic, and
   wherein assigning frames to access categories of different relative priority comprises:
      assigning voice signaling frames to the second access category;
      assigning video signaling frames to the second access category;
      assigning voice content frames to the third access category;
      assigning video content frames to the third access category;
      assigning best-effort frames to the fourth access category; and
      assigning background frames to the fourth access category.

3. A method in a wireless local area network communication device, the method comprising:
   assigning frames to access categories of different relative priority, where each access category has a different transmit queue associated therewith;
   adding frames assigned to a particular access category to the transmit queue associated with the particular access category; and
   selecting, in a manner that takes into account the relative priority of the access categories, frames from the transmit queues for transmission over a wireless medium,
   wherein the access categories consist of a first access category of highest priority defined for voice traffic, a second access category of second highest priority defined for video traffic, a third access category of third highest priority defined for best effort traffic, and a fourth access category of lowest priority defined for background traffic, and wherein assigning frames to access categories of different relative priority comprises:

assigning voice signaling frames to the first access category;

assigning video signaling frames to the second access category;

assigning voice content frames to the second access category;

assigning video content frames to the third access category;

assigning best-effort frames to the fourth access category; and assigning background frames to the fourth access category.

4. A wireless local area network communication device comprising:

one or more processors;

a protocol stack arranged to be controlled by any of the processors;

one or more antennae coupled to the stack and through which the device is able to communicate over a wireless medium; and a memory coupled to the one or more processors, where the memory is arranged to store executable code which, when executed by any of the one or more processors, is arranged to cause the device:

to assign frames to access categories of different relative priority, where each access category has a different transmit queue in a Media Access Control (MAC) layer of the protocol stack associated therewith, to add frames assigned to a particular access category to the transmit queue associated with the particular access category, and to select, in a manner that takes into account the relative priority of the access categories, frames from the transmit queues for transmission over the wireless medium, wherein the access categories consist of a first access category of highest priority defined for voice traffic, a second access category of second highest priority defined for video traffic, a third access category of third highest priority defined for best effort traffic, and a fourth access category of lowest priority defined for background traffic, and wherein the executable code, when executed by any of the one or more processors, is arranged to cause the device to assign frames to access categories of different relative priority by:

assigning voice signaling frames to the first access category;

assigning video signaling frames to the first access category;

assigning voice content frames to the second access category;

assigning video content frames to the third access category;

assigning best-effort frames to the fourth access category; and assigning background frames to the fourth access category.

5. The communication device of claim 4, wherein the device is an access point.

6. The communication device of claim 4, wherein the device is a station.

7. The communication device of claim 4, wherein the device is Wireless Fidelity (Wi-Fi) MultiMedia (WMM) enabled.

8. A wireless local area network communication device comprising:

one or more processors;

a protocol stack arranged to be controlled by any of the processors;

one or more antennae coupled to the stack and through which the device is able to communicate over a wireless medium; and a memory coupled to the one or more processors, where the memory is arranged to store executable code which, when executed by any of the one or more processors, is arranged to cause the device:

to assign frames to access categories of different relative priority, where each access category has a different transmit queue in a Media Access Control (MAC) layer of the protocol stack associated therewith, to add frames assigned to a particular access category to the transmit queue associated with the particular access category, and to select, in a manner that takes into account the relative priority of the access categories, frames from the transmit queues for transmission over the wireless medium, wherein the access categories consist of a first access category of highest priority defined for voice traffic, a second access category of second highest priority defined for video traffic, a third access category of third highest priority defined for best effort traffic, and a fourth access category of lowest priority defined for background traffic, and wherein the executable code, when executed by any of the one or more processors, is arranged to cause the device to assign frames to access categories of different relative priority by:

assigning voice signaling frames to the second access category;

assigning video signaling frames to the second access category;

assigning voice content frames to the third access category;

assigning video content frames to the third access category;

assigning best-effort frames to the fourth access category; and assigning background frames to the fourth access category.

9. The communication device of claim 8, wherein the device is an access point.

10. The communication device of claim 8, wherein the device is a station.

11. The communication device of claim 8, wherein the device is Wireless Fidelity (Wi-Fi) MultiMedia (WMM) enabled.

12. A wireless local area network communication device comprising:

one or more processors;

a protocol stack arranged to be controlled by any of the processors;

one or more antennae coupled to the stack and through which the device is able to communicate over a wireless medium; and a memory coupled to the one or more processors, where the memory is arranged to store executable code which, when executed by any of the one or more processors, is arranged to cause the device:

to assign frames to access categories of different relative priority, where each access category has a different transmit queue in a Media Access Control (MAC) layer of the protocol stack associated therewith, to add frames assigned to a particular access category to the transmit queue associated with the particular access category, and to select, in a manner that takes into account the relative priority of the access categories, frames from the transmit queues for transmission over the wireless medium, wherein the access categories consist of a first access category of highest priority defined for voice traffic, a second access category of second highest priority defined for video traffic, a third access category of third highest priority defined for best effort traffic, and a fourth access category of lowest priority defined for background traffic, and wherein the executable code, when executed by any of the one or more processors, is arranged to cause the device to assign frames to access categories of different relative priority by:

assigning voice signaling frames to the first access category;

assigning video signaling frames to the second access category;

assigning voice content frames to the second access category;

assigning video content frames to the third access category;

assigning best-effort frames to the fourth access category; and assigning background frames to the fourth access category.

13. The communication device of claim 12, wherein the device is an access point.

14. The communication device of claim 12, wherein the device is a station.

15. The communication device of claim 12, wherein the device is Wireless Fidelity (Wi-Fi) MultiMedia (WMM) enabled.

* * * * *